United States Patent
Sattler et al.

(10) Patent No.: US 8,131,644 B2
(45) Date of Patent: Mar. 6, 2012

(54) FORMULAR UPDATE

(75) Inventors: Juergen Sattler, Wiesloch (DE); Joachim Gaffga, Wiesloch (DE); Werner Wolf, Wiesloch (DE); Robert Viehmann, Waghausl (DE); Frank Markert, Grossostheim (DE)

(73) Assignee: SAP AG, Walldorf (DE)

( * ) Notice: Subject to any disclaimer, the term of this patent is extended or adjusted under 35 U.S.C. 154(b) by 913 days.

(21) Appl. No.: 11/512,886

(22) Filed: Aug. 29, 2006

(65) Prior Publication Data

US 2008/0071828 A1 Mar. 20, 2008

(51) Int. Cl.
*H04L 9/32* (2006.01)
*H04K 1/10* (2006.01)

(52) U.S. Cl. .............. 705/51; 707/600; 705/50; 705/54; 705/57; 705/59; 705/901; 705/902; 705/903; 705/904; 705/911; 380/227; 380/228; 380/229; 380/230

(58) Field of Classification Search ................ 705/1–79, 705/51; 709/202–205
See application file for complete search history.

(56) References Cited

U.S. PATENT DOCUMENTS

| | | |
|---|---|---|
| 4,079,452 A | 3/1978 | Larson et al. |
| 4,501,528 A | 2/1985 | Knapp |
| 5,307,499 A | 4/1994 | Yin |
| 5,428,791 A | 6/1995 | Andrew |
| 5,459,868 A | 10/1995 | Fong |
| 5,647,056 A | 7/1997 | Barrett et al. |
| 5,657,448 A | 8/1997 | Wadsworth et al. |
| 5,680,624 A | 10/1997 | Ross |
| 5,754,845 A | 5/1998 | White |
| 5,758,062 A | 5/1998 | McMahon et al. |
| 5,857,102 A | 1/1999 | McChesney et al. |
| 5,978,579 A | 11/1999 | Buxton et al. |
| 6,006,035 A | 12/1999 | Nabahi |
| 6,044,461 A | 3/2000 | Agha et al. |
| 6,067,525 A | 5/2000 | Johnson et al. |
| 6,128,730 A | 10/2000 | Levine |
| 6,161,123 A | 12/2000 | Renouard et al. |
| 6,161,176 A | 12/2000 | Hunter et al. |
| 6,185,587 B1 | 2/2001 | Bernardo et al. |

(Continued)

FOREIGN PATENT DOCUMENTS

JP 2004287972 A 10/2004
(Continued)

OTHER PUBLICATIONS

Tseng, Chiu-Yu, et al., "An initial investigation of L1 and L2 discourse speech planning in English", Chinese Spoken Language Processing (ISCSLP), DOI' 10.1109/SCSLP.2010.5684851, ©2010, pp. 55-59. Retrieved from IDS.*

(Continued)

*Primary Examiner* — James A Reagan
(74) *Attorney, Agent, or Firm* — Schwegman, Lundberg & Woessner, P.A.

(57) ABSTRACT

The subject matter relates to software application collaboration and, more particularly, collaboration between software applications via formular updates. Some such embodiments include systems, methods, and software to receive a definition of a content item from a first party, wherein the content item is operable within an application of a second party to cause data to be exported by the second party's application in a manner that can be imported to an application of the first party. Some such embodiments further include sending the content item to the second party.

17 Claims, 9 Drawing Sheets

U.S. PATENT DOCUMENTS

| | | |
|---|---|---|
| 6,189,139 B1 | 2/2001 | Ladd |
| 6,230,305 B1 | 5/2001 | Meares |
| 6,301,710 B1 | 10/2001 | Fujiwara |
| 6,321,282 B1 | 11/2001 | Horowitz et al. |
| 6,324,578 B1 | 11/2001 | Cox et al. |
| 6,397,232 B1 | 5/2002 | Cheng-Hung et al. |
| 6,449,624 B1 | 9/2002 | Hammack et al. |
| 6,453,302 B1 | 9/2002 | Johnson et al. |
| 6,466,972 B1 | 10/2002 | Paul et al. |
| 6,513,045 B1 | 1/2003 | Casey et al. |
| 6,523,027 B1 | 2/2003 | Underwood |
| 6,538,668 B1 | 3/2003 | Ruberg et al. |
| 6,539,372 B1 | 3/2003 | Casey et al. |
| 6,728,877 B2 | 4/2004 | Mackin et al. |
| 6,763,327 B1 | 7/2004 | Songer et al. |
| 6,804,709 B2 | 10/2004 | Manjure et al. |
| 6,810,401 B1 | 10/2004 | Thompson et al. |
| 6,868,392 B1 | 3/2005 | Ogasawara |
| 7,031,951 B2 | 4/2006 | Mancisidor et al. |
| 7,032,114 B1 | 4/2006 | Moran |
| 7,051,130 B1 | 5/2006 | Horowitz et al. |
| 7,062,502 B1 | 6/2006 | Kesler |
| 7,089,317 B2 | 8/2006 | Jeyaraman et al. |
| 7,099,945 B2 | 8/2006 | Lugger et al. |
| 7,174,400 B2 | 2/2007 | Horowitz et al. |
| 7,181,731 B2 | 2/2007 | Pace et al. |
| 7,206,827 B2 | 4/2007 | Viswanath et al. |
| 7,209,851 B2 | 4/2007 | Singh et al. |
| 7,228,326 B2 | 6/2007 | Srinivasan et al. |
| 7,283,816 B2 | 10/2007 | Fok et al. |
| 7,299,382 B2 | 11/2007 | Jorapur |
| 7,305,659 B2 | 12/2007 | Muller et al. |
| 7,337,317 B2 | 2/2008 | Meggitt et al. |
| 7,340,411 B2 | 3/2008 | Cook |
| 7,346,766 B2 | 3/2008 | Mackin et al. |
| 7,360,211 B2 | 4/2008 | Hyden et al. |
| 7,379,455 B2 | 5/2008 | Pickett |
| 7,412,497 B2 | 8/2008 | Viswanath et al. |
| 7,421,621 B1 | 9/2008 | Zambrana et al. |
| 7,426,694 B2 | 9/2008 | Gross et al. |
| 7,451,451 B2 | 11/2008 | Schaefer |
| 7,487,231 B2 | 2/2009 | Brown et al. |
| 7,519,964 B1 | 4/2009 | Islam et al. |
| 7,526,457 B2 | 4/2009 | Duevel et al. |
| 7,540,014 B2 | 5/2009 | Vasishth et al. |
| 7,546,390 B2 | 6/2009 | Horowitz et al. |
| 7,590,669 B2 | 9/2009 | Yip et al. |
| 7,593,124 B1 | 9/2009 | Sheng et al. |
| 7,599,895 B2 | 10/2009 | Nugent |
| 7,603,452 B1 | 10/2009 | Guo |
| 7,606,840 B2 * | 10/2009 | Malik ................ 707/203 |
| 7,609,651 B1 | 10/2009 | McBride et al. |
| 7,610,582 B2 | 10/2009 | Becker et al. |
| 7,617,256 B2 * | 11/2009 | Mohamed et al. ............ 707/203 |
| 7,640,542 B2 | 12/2009 | Herenyi et al. |
| 7,644,432 B2 | 1/2010 | Patrick et al. |
| 7,657,887 B2 | 2/2010 | Kothandaraman et al. |
| 7,665,082 B2 | 2/2010 | Wyatt et al. |
| 7,685,577 B2 | 3/2010 | Pace et al. |
| 7,694,181 B2 | 4/2010 | Noller et al. |
| 7,702,897 B2 | 4/2010 | Reed et al. |
| 7,716,634 B2 | 5/2010 | Ross et al. |
| 7,725,200 B2 | 5/2010 | Reed et al. |
| 7,725,877 B2 | 5/2010 | Andrade et al. |
| 7,739,657 B2 | 6/2010 | Rolfs |
| 7,823,124 B2 | 10/2010 | Sattler et al. |
| 7,827,528 B2 | 11/2010 | Sattler et al. |
| 7,831,568 B2 | 11/2010 | Sattler et al. |
| 7,831,637 B2 | 11/2010 | Sattler et al. |
| 7,908,589 B2 | 3/2011 | Sattler et al. |
| 7,912,800 B2 | 3/2011 | Sattler et al. |
| 2001/0044834 A1 | 11/2001 | Bradshaw et al. |
| 2001/0054091 A1 | 12/2001 | Lenz et al. |
| 2002/0026572 A1 | 2/2002 | Joory |
| 2002/0095663 A1 | 7/2002 | Joory |
| 2002/0099578 A1 | 7/2002 | Eicher et al. |
| 2002/0104097 A1 | 8/2002 | Jerding et al. |
| 2002/0116373 A1 * | 8/2002 | Nishikawa et al. ............ 707/3 |
| 2002/0138570 A1 | 9/2002 | Hickey |
| 2002/0147784 A1 | 10/2002 | Gold et al. |
| 2002/0156947 A1 | 10/2002 | Nishio |
| 2002/0188625 A1 | 12/2002 | Jans et al. |
| 2003/0005411 A1 | 1/2003 | Gerken |
| 2003/0023963 A1 | 1/2003 | Birkholz et al. |
| 2003/0115292 A1 | 6/2003 | Griffin et al. |
| 2003/0120780 A1 | 6/2003 | Zhu et al. |
| 2003/0135842 A1 | 7/2003 | Frey et al. |
| 2003/0227392 A1 | 12/2003 | Ebert et al. |
| 2003/0237093 A1 | 12/2003 | Marsh et al. |
| 2004/0019669 A1 | 1/2004 | Viswanath et al. |
| 2004/0019670 A1 | 1/2004 | Viswanath et al. |
| 2004/0031030 A1 | 2/2004 | Kidder et al. |
| 2004/0060047 A1 | 3/2004 | Talati et al. |
| 2004/0088691 A1 | 5/2004 | Hammes et al. |
| 2004/0111417 A1 * | 6/2004 | Goto et al. ................. 707/10 |
| 2004/0268342 A1 | 12/2004 | Hyden et al. |
| 2005/0007964 A1 | 1/2005 | Falco et al. |
| 2005/0044215 A1 | 2/2005 | Cohen et al. |
| 2005/0044546 A1 | 2/2005 | Niebling et al. |
| 2005/0080801 A1 | 4/2005 | Kothandaraman et al. |
| 2005/0108219 A1 * | 5/2005 | De La Huerga ................. 707/3 |
| 2005/0108707 A1 | 5/2005 | Taylor et al. |
| 2005/0138558 A1 | 6/2005 | Duevel et al. |
| 2005/0144474 A1 | 6/2005 | Takala et al. |
| 2005/0160419 A1 | 7/2005 | Alam et al. |
| 2005/0188422 A1 | 8/2005 | Jooste |
| 2005/0193103 A1 | 9/2005 | Drabik |
| 2005/0262076 A1 | 11/2005 | Voskuil |
| 2005/0262499 A1 | 11/2005 | Read |
| 2005/0268282 A1 | 12/2005 | Laird |
| 2005/0278202 A1 | 12/2005 | Broomhall et al. |
| 2005/0278280 A1 | 12/2005 | Semerdzhiev et al. |
| 2006/0037000 A1 | 2/2006 | Speeter et al. |
| 2006/0047793 A1 | 3/2006 | Agrawal et al. |
| 2006/0173857 A1 | 8/2006 | Jackson |
| 2006/0184917 A1 | 8/2006 | Troan et al. |
| 2006/0184926 A1 | 8/2006 | Or et al. |
| 2006/0224637 A1 * | 10/2006 | Wald .............................. 707/200 |
| 2006/0234698 A1 | 10/2006 | Fok et al. |
| 2006/0242697 A1 | 10/2006 | Takemura |
| 2006/0248450 A1 | 11/2006 | Wittenberg et al. |
| 2006/0253588 A1 | 11/2006 | Gao et al. |
| 2007/0006161 A1 | 1/2007 | Kuester et al. |
| 2007/0016591 A1 | 1/2007 | Beadles et al. |
| 2007/0022323 A1 | 1/2007 | Loh et al. |
| 2007/0025704 A1 * | 2/2007 | Tsukazaki et al. ............... 386/96 |
| 2007/0074203 A1 | 3/2007 | Curtis et al. |
| 2007/0079289 A1 | 4/2007 | MacCaux et al. |
| 2007/0079291 A1 | 4/2007 | Roth |
| 2007/0093926 A1 | 4/2007 | Braun et al. |
| 2007/0097975 A1 | 5/2007 | Rakers et al. |
| 2007/0157185 A1 | 7/2007 | Semerdzhiev |
| 2007/0157192 A1 | 7/2007 | Hoefler et al. |
| 2007/0168065 A1 | 7/2007 | Nixon et al. |
| 2007/0168971 A1 | 7/2007 | Royzen et al. |
| 2007/0198437 A1 | 8/2007 | Eisner et al. |
| 2007/0234274 A1 | 10/2007 | Ross et al. |
| 2007/0234293 A1 | 10/2007 | Noller et al. |
| 2007/0257715 A1 | 11/2007 | Semerdzhiev et al. |
| 2008/0059474 A1 | 3/2008 | Lim |
| 2008/0059490 A1 | 3/2008 | Sattler et al. |
| 2008/0059537 A1 | 3/2008 | Sattler et al. |
| 2008/0059630 A1 | 3/2008 | Sattler et al. |
| 2008/0071555 A1 | 3/2008 | Sattler et al. |
| 2008/0071718 A1 | 3/2008 | Sattler et al. |
| 2008/0071839 A1 | 3/2008 | Sattler et al. |
| 2008/0082517 A1 | 4/2008 | Sattler et al. |
| 2008/0126375 A1 | 5/2008 | Sattler et al. |
| 2008/0126448 A1 | 5/2008 | Sattler et al. |
| 2008/0127082 A1 | 5/2008 | Birimisa et al. |
| 2008/0127084 A1 | 5/2008 | Sattler et al. |
| 2008/0127085 A1 | 5/2008 | Sattler et al. |
| 2008/0127086 A1 | 5/2008 | Sattler et al. |
| 2008/0127123 A1 | 5/2008 | Sattler et al. |
| 2008/0195579 A1 * | 8/2008 | Kennis et al. ..................... 707/3 |
| 2009/0024990 A1 | 1/2009 | Singh et al. |
| 2009/0193439 A1 | 7/2009 | Bernebeu-auban et al. |

| | | | |
|---|---|---|---|
| 2009/0300416 A1 | 12/2009 | Watanabe et al. | |
| 2010/0082518 A1 | 4/2010 | Gaffga et al. | |
| 2010/0153443 A1 | 6/2010 | Gaffga et al. | |
| 2010/0153468 A1 | 6/2010 | Lange et al. | |
| 2010/0192135 A1 | 7/2010 | Krishnaswamy et al. | |
| 2011/0035629 A1 | 2/2011 | Noller et al. | |

FOREIGN PATENT DOCUMENTS

| | | | |
|---|---|---|---|
| WO | WO-2004114130 A2 | 12/2004 | |
| WO | WO 2005/045670 A1 * | 5/2005 | |
| WO | WO-2005045670 A1 | 5/2005 | |

OTHER PUBLICATIONS

"International Application Serial No. PCT/EP2007/007460, International Search Report Nov. 2, 2007", 5 pgs.

"International Application Serial No. PCT/EP2007/007460, Written Opinion Nov. 2, 2007", 7 pgs.

"International Application Serial No. PCT/EP2007/007461. International Search Report Nov. 26, 2007", 7 pgs.

"International Application Serial No. PCT/EP2007/007462, Partial International Search Report Dec. 27, 2007", 8 pgs.

"International Application Serial No. PCT/EP2007/007490, International Search Report Oct. 26, 2007", 4 pgs.

"International Application Serial No. PCT/EP2007/007491, International Search Report Oct. 22, 2007", 5 pgs.

"International Application Serial No. PCT/EP2007/007491, Written Opinion Oct. 22, 2007", 6 pgs.

"International Application Serial No. PCT/EP2007/007515, International Search Report Nov. 12, 2007", 8 pgs.

Indigorose, "Setup Factory", *User's Guide IndigoRose Software Design No. 2* (Mar. 1998),82 pgs.

"International Application Serial No. PCT/EP2007/007461, International Search Report mailed Feb. 5, 2008", 8 pgs.

"International Application Serial No. PCT/EP2007/007461, Written Opinion mailed Feb. 5, 2008", 9 pgs.

"International Application Serial No. PCT/EP2007/007462, International Search Report Mailed Mar. 17, 2008", 7 pgs.

"International Application Serial No. PCT/EP2007/007462, Written Opinion Mailed Mar. 17, 2008", 8 pgs.

"International Application Serial No. PCT/EP2007/007490, International Search Report mailed Jan. 24, 2008", 7 pgs.

"International Application Serial No. PCT/EP2007/007490, Written Opinion mailed Jan. 24, 2008", 9 pgs.

"International Application Serial No. PCT/EP2007/007515, International Search Report mailed Jan. 24, 2008", 8 pgs.

"International Application Serial No. PCT/EP2007/007515, Written Opinion mailed Jan. 24, 2008", 12 pgs.

"U.S. Appl. No. 11/512,443, Response filed Oct. 9, 2008 to Non-Final Office Action mailed Jul. 9, 2008", 11 pgs.

"U.S. Appl. No. 11/512,443, Non-Final Office Action mailed Jul. 9, 2008", 17 pgs.

"U.S. Appl. No. 11/512,517, Non-Final Office Action mailed Oct. 29, 2008", 13 pgs.

"U.S. Appl. No. 11/512,519 response filed Nov. 11, 2008 to Non-Final Office Action mailed Sep. 11, 2008", 15 pgs.

"U.S. Appl. No. 11/512,519, Non-FinalOffice Action mailed Sep. 11, 2008", 14 pgs.

"U.S. Appl. No. 11/512,609, Non Final Office Action mailed on Jun. 19, 2008", 9 pgs.

"U.S. Appl. No. 11/512,609, Response filed Sep. 19, 2008 to Non-Final Office Action mailed Jun. 19, 2008", 8 pgs.

"U.S. Appl. No. 11/512,884, Non-Final Office Action Mailed Jul. 29, 2008", 12 pgs.

"U.S. Appl. No. 11/512,884, Response filed Sep. 23, 2008 to Non-Final Office Action mailed Jul. 29, 2008", 17 pgs.

Liu, et al., "A Knowledge-Based Approach to Requirements Analysis", (1995).

"U.S. Appl. No. 11/512,443 Final Office Action mailed Feb. 6, 2009", 20 pgs.

"U.S. Appl. No. 11/512,516, Non-Final Office Action mailed Feb. 4, 2009", 12 pgs.

"U.S. Appl. No. 11/512,517, Response to Non-Final Office Action mailed Jun. 29, 2009", 16 pgs.

"U.S. Appl. No. 11/512,519, Final Office Action mailed Feb. 2, 2009", 14 pgs.

"U.S. Appl. No. 11/512,609 response filed Feb. 17, 2009 to Final Office Action mailed Dec. 8, 2008", 10 pgs.

"U.S. Appl. No. 11/512,609, Final Office Action mailed Dec. 8, 2008", 12 pgs.

"U.S. Appl. No. 11/512,884, Final Office Action mailed Dec. 19, 2008", 11 pgs.

"U.S. Appl. No. 11/512,609, Non-Final Office Action mailed Apr. 27, 2009", 15 pgs.

"U.S. Appl. No. 11/512,443, Non-Final Office Action mailed Jun. 26, 2009", 14 pgs.

"U.S. Appl. No. 11/512,516, Non-Final Office Action mailed Jul. 10 2009", 15 Pgs.

"U.S. Appl. No. 11/512,516, Response filed Apr. 28 2009 to Non Final Office Action mailed Feb. 4, 2009", 16 pgs.

"U.S. Appl. No. 11/512,517, Notice of Allowance mailed Apr. 3, 2009", 10 pgs.

"U.S. Appl. No. 11/512,520, Non-Final Office Action mailed Jul. 22, 2009", 14 pgs.

"U.S. Appl. No. 11/512,609, Response filed Jul. 24, 2009 to Non Final Office Action mailed Apr. 27, 2009", 11 pgs.

"U.S. Appl. No. 11/512,517, Non-Final Office Action mailed Sep. 16, 2009", 17 Pgs.

U.S. Appl. No. 7,571,147, filed Aug. 4, 2009, Sattler et al. (withdrawn).

"U.S. Appl. No. 11/512,441, Notice of Allowance mailed Jul. 19, 2011", 13 pgs.

"U.S. Appl. No. 12/243,827, Notice of Allowance mailed Jul. 29, 2011", 10 pg s.

"U.S. Appl. No. 12/332,513, Response filed Jun. 28, 2011 to Non Final Office Action mailed Mar. 28, 2011", 11 pgs.

"U.S. Appl. No. 12/332,513, Examiner Interview Summary mailed Mar. 23, 2011", 3 pgs.

"U.S. Appl. No. 12/336,931, Response filed Jun. 14, 2011 to Non Final Office Action mailed Mar. 14, 2011", 10 pgs.

Jan, EA-EE, et al., "A novel approach for proper name transliteration verification", Chinese Spoken Language Processing (ISCSLP), DOI: 10.1109/ISCSLP.2010.5684842, (2010), 89-94.

Othman, M., et al., "Analysis of TCP-Reno and TCP-Vegas over AOMDV routing protocol for mobile ad hoc network", Advanced Communication Technology (ICACT), 2010 The 12th International Conference on vol. 2, (2010), 1104-1108.

Tseng, Chiu-Yu, et al., "An initial investigation of L1 and L2 discourse speech planning in English", Chinese Spoken Language Processing (ISCSLP), DOI: 10.1109/ISCSLP.2010.5684851, (2010), 55-59.

"U.S. Appl. No. 11/512,443, Final Office Action mailed Jan. 22, 2010", 14 pgs.

"U.S. Appl. No. 11/512,516, Final Office Action mailed Mar. 5, 2010", 18 pgs.

"U.S. Appl. No. 11/512,517, Examiner Interview Summary mailed Dec. 24, 2009", 3 pgs.

"U.S. Appl. No. 11/512,517, Notice of Allowance mailed Jan. 21, 2010", 8 pgs.

"U.S. Appl. No. 11/512,520, Notice of Allowance mailed Jan. 25, 2010", 6 pgs.

"U.S. Appl. No. 11/512,442, Final Office Action mailed Apr. 21, 2010", 13 pgs.

"U.S. Appl. No. 11/512,443, Response filed Apr. 22, 2010 to Final Office Action mailed Jan. 22, 2010", 12 pgs.

"U.S. Appl. No. 11/512,457, Non-Final Office Action mailed May 13, 2010", 11 pgs.

"U.S. Appl. No. 11/512,516, Response filed Apr. 30, 2010 to Final Office Action mailed Mar. 5, 2010", 9 pgs.

"U.S. Appl. No. 11/512,608, Non-Final Office Action mailed May 12, 2010", 12 pgs.

Krintz, Chandra J., ""Reducing load delay to improve performance of Internet-computing programs"", *University of California, San Diego*, (2001), 225 pgs.

"U.S. Appl. No. 11/511,357 Non-Final Office Action mailed Jul. 2, 2010", 11 pgs.

"U.S. Appl. No. 11/512,440, Non-Final Office Action mailed Jun. 17, 2010", 14 pgs.

"U.S. Appl. No. 11/512,441, Non-Final Office Action mailed Jun. 21, 2010", 8 pgs.

"U.S. Appl. No. 11/512,442, Response filed Jun. 21, 2010 to Final Office Action mailed Apr. 21, 2010", 9 pgs.

"U.S. Appl. No. 11/512,457 Notice of Allowance mailed Aug. 13, 2010", 13 pgs.

"U.S. Appl. No. 11/512,457, Response filed Aug. 5, 2010 to Non Final Office Action mailed May 13, 2010", 10 pgs.

"U.S. Appl. No. 11/512,516 Non-Final Office Action mailed Jul. 8, 2010", 20 pgs.

"U.S. Appl. No. 11/512,517 Non-Final Office Action mailed Aug. 16, 2010", 30 pgs.

"U.S. Appl. No. 11/512,518, Non-Final Office Action mailed May 27, 2010", 14 pgs.

"U.S. Appl. No. 11/512,520, Notice of Allowance mailed Jun. 15, 2010", 6 pgs.

"U.S. Appl. No. 11/512,608, Notice of Allowance mailed Aug. 13, 2010", 12 pgs.

"U.S. Appl. No. 11/512,608, Response filed Aug. 5, 2010 to Non Final Office Action mailed May 12, 2010", 10 pgs.

Bellissard, Luc, et al., "Component-based Programming and Application Management with Olan, Proceedings of Workshop on Distributed Computing", Retrieved on [Jun. 15, 2010] Retrieved from the Internet: URL<http://www.springerlink.com/contenUf2g8rI4083393124/fulitext.pdf>, (1995).

Dotoli, et al., "A decision support system for the supply chain configuration", IEEE, (Oct. 8, 2003), 6 pgs.

Gu, Mingyang, et al., "Component Retrieval Using Conversational Case-Base Reasoning", IEA/AIE, Annecy, France, (Jun. 27-30,2006), 12 pgs.

Hwang, Jeong Hee, et al., "Context Based Recommendation Service in Ubiquitous Commerce", Database Laboratory, Chungbuk National University, Korea, Springer-Verlag Berlin Heidelberg (2005).

Kahl, Fredrik, et al., "Critical configurations for n-view projective reconstruction", IEEE, (Dec. 14, 2001), 6 pgs.

Park, Young, "Software retrieval by samples using concept analysis", Journal of Systems and Software 54, (2000), 179-183.

Virgilo, "A Rule-based Approach to Content Delivery Adaptation in Web Information Systems", Proc. 7th International Conference on Mobile Data Management, IEEE, (May 12, 2006), 4 pgs.

"U.S. Appl. No. 11/512,440, Notice of Allowance mailed Nov. 12, 2010.", 14 pgs.

"U.S. Appl. No. 11/512,440, Response filed Oct. 18, 2010 to Non Final Office Action mailed Jun. 17, 2010", 11 pgs.

"U.S. Appl. No. 11/512,441, Final Office Action mailed Dec. 1, 2010", 7 pgs.

"U.S. Appl. No. 11/512,441, Non Final Office Action mailed Mar. 23, 2011", 9 pgs.

"U.S. Appl. No. 11/512,441, Response filed Mar. 1, 2011 to Final Office Action mailed Dec. 1, 2010", 8 pgs.

"U.S. Appl. No. 11/512,441, Response filed Sep. 21, 2010 to Non Final Office Action mailed Jun. 21, 2010", 8 pgs.

"U.S. Appl. No. 11/512,442, Non Final Office Action mailed Feb. 2, 2011", 14 pgs.

"U.S. Appl. No. 11/512,443, Notice of Allowance mailed Sep. 21, 2010", 17 pgs.

"U.S. Appl. No. 11/512,457, Notice of Allowance mailed Sep. 17, 2010", 7 pgs.

"U.S. Appl. No. 11/512,516, Final Office Action mailed Dec. 22, 2010", 23 pgs.

"U.S. Appl. No. 11/512,516, Response filed Oct. 8, 2010 to Non Final Office Action mailed Jul. 8, 2010", 11 pgs.

"U.S. Appl. No. 11/512,517, Notice of Allowance mailed Feb. 8, 2011", 10 pgs.

"U.S. Appl. No. 11/512,517, Response filed Nov. 16, 2010 to Non Final Office Action mailed Aug. 16, 2010", 8 pgs.

"U.S. Appl. No. 11/512,518 Final Office Action mailed Oct. 15, 2010", 15 pgs.

"U.S. Appl. No. 11/512,518, Response filed Aug. 24, 2010 to Non Final Office Action mailed May 27, 2010", 10 pgs.

"U.S. Appl. No. 11/512,520 Notice of Allowance mailed Sep. 29, 2010", 6 pgs.

"U.S. Appl. No. 11/512,608 Notice of Allowance mailed Sep. 8, 2010", 8 pgs.

"U.S. Appl. No. 12/332,513, Non Final Office Action mailed Mar. 28, 2011", 20 pgs.

"U.S. Appl. No. 12/336,931, Non Final Office Action mailed Mar. 14, 2011", 11 pgs.

Brown, Wanda Jones, et al., ""Configuration Management Plan for the Science Data Processing System"", Upper Marlboro, Maryland, (Apr. 2001).

Ganguly, et al., "Reducing Complexity of Software Deployment with Delta Configuration", IEEE, (May 21, 2007), 729-732.

Sloane, et al., "Modeling Deployment and Configuration of Cobra Systems with UML", IEEE, (2000), 778.

Ying Li, et al., "Modeling and Verifying Configuration in Service Deployment", IEEE, (2006), 8 pgs.

US 7,730,006, 06/2010, Wiesloch et al. (withdrawn)

* cited by examiner

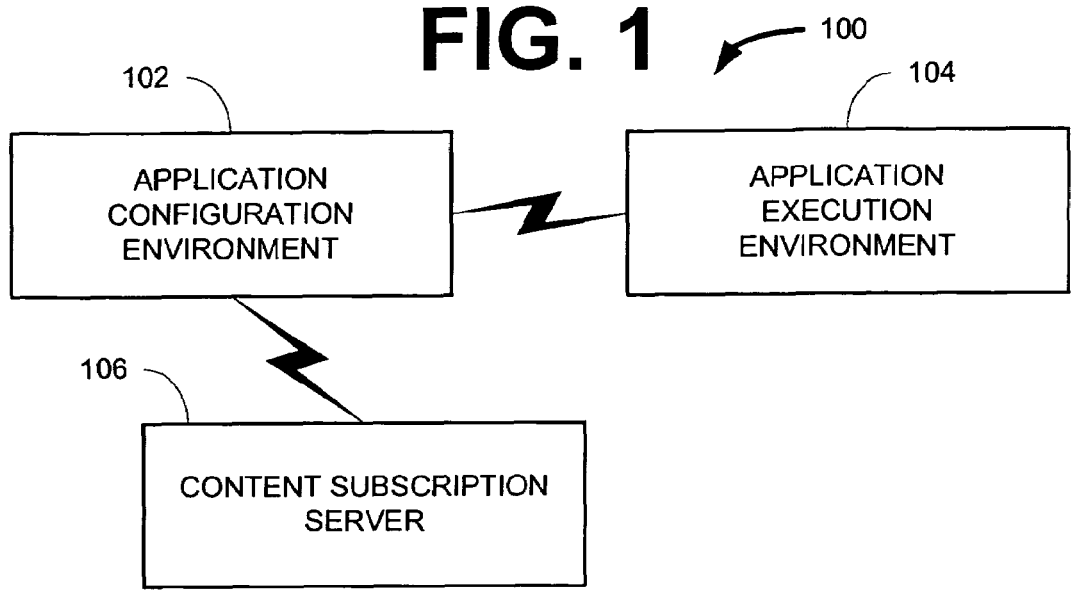
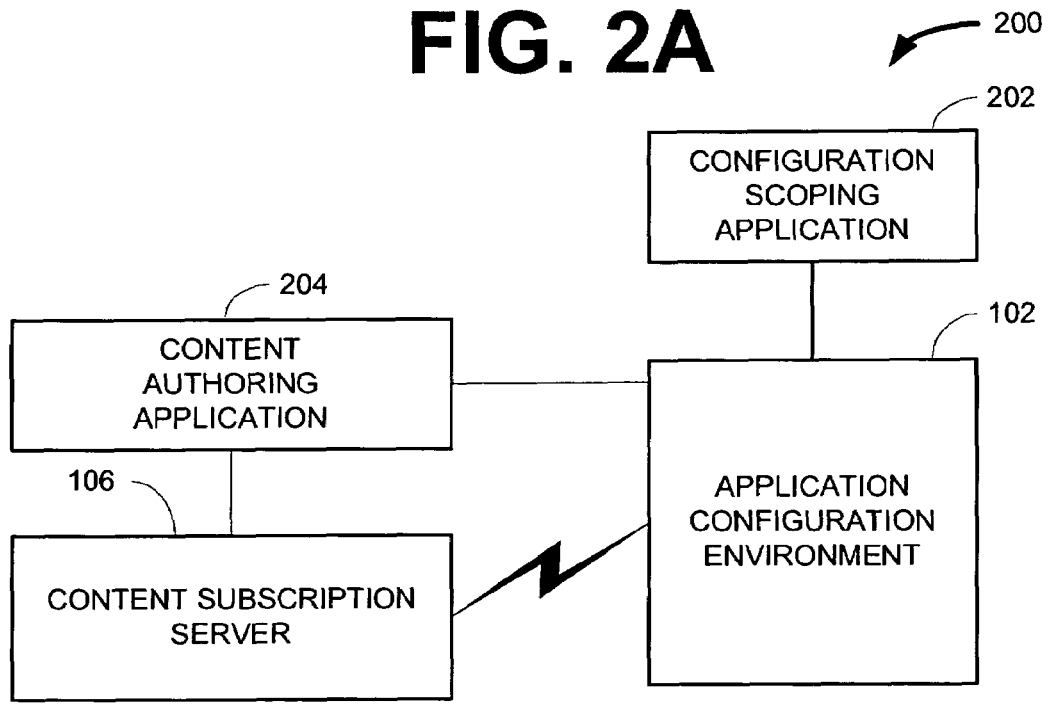

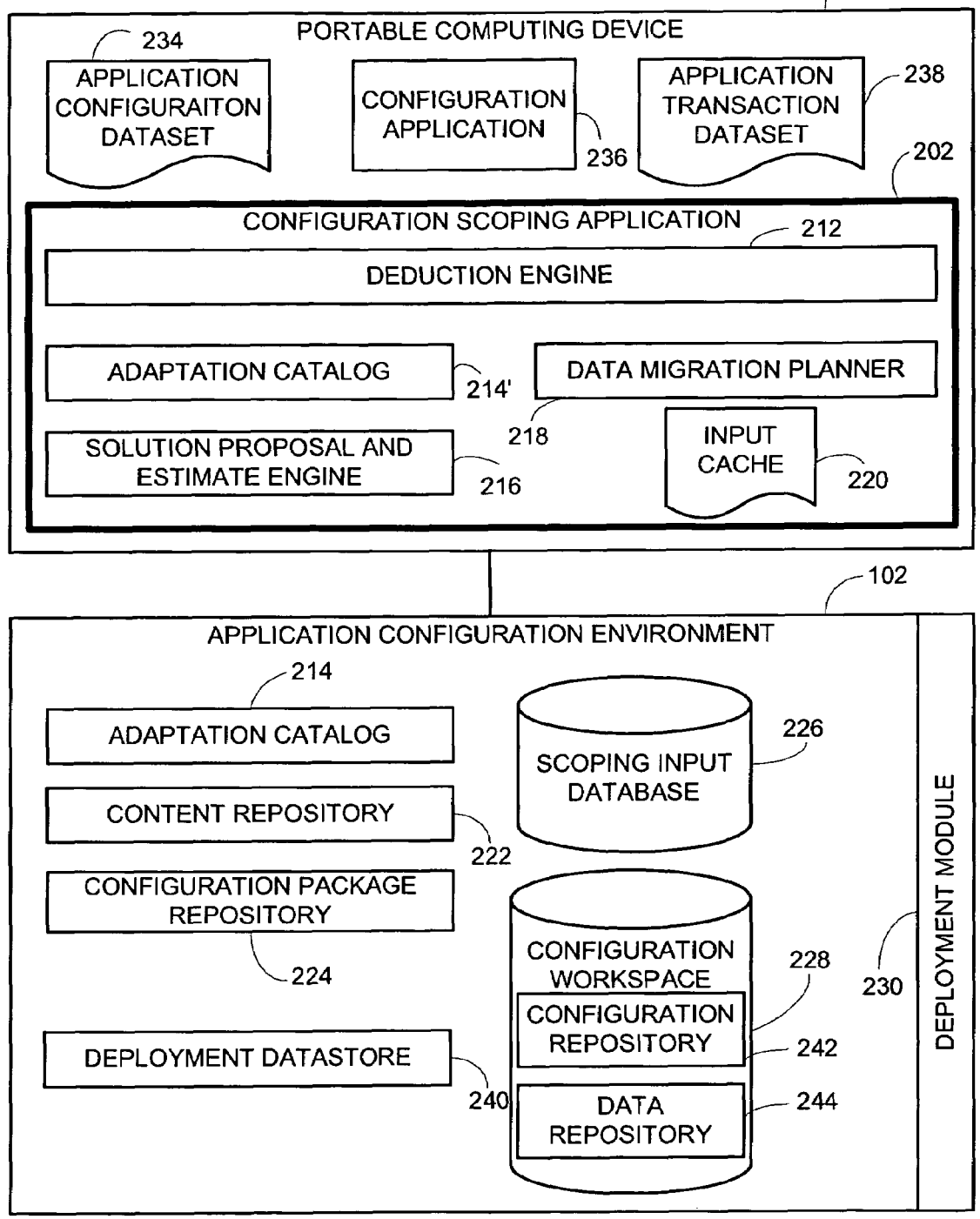

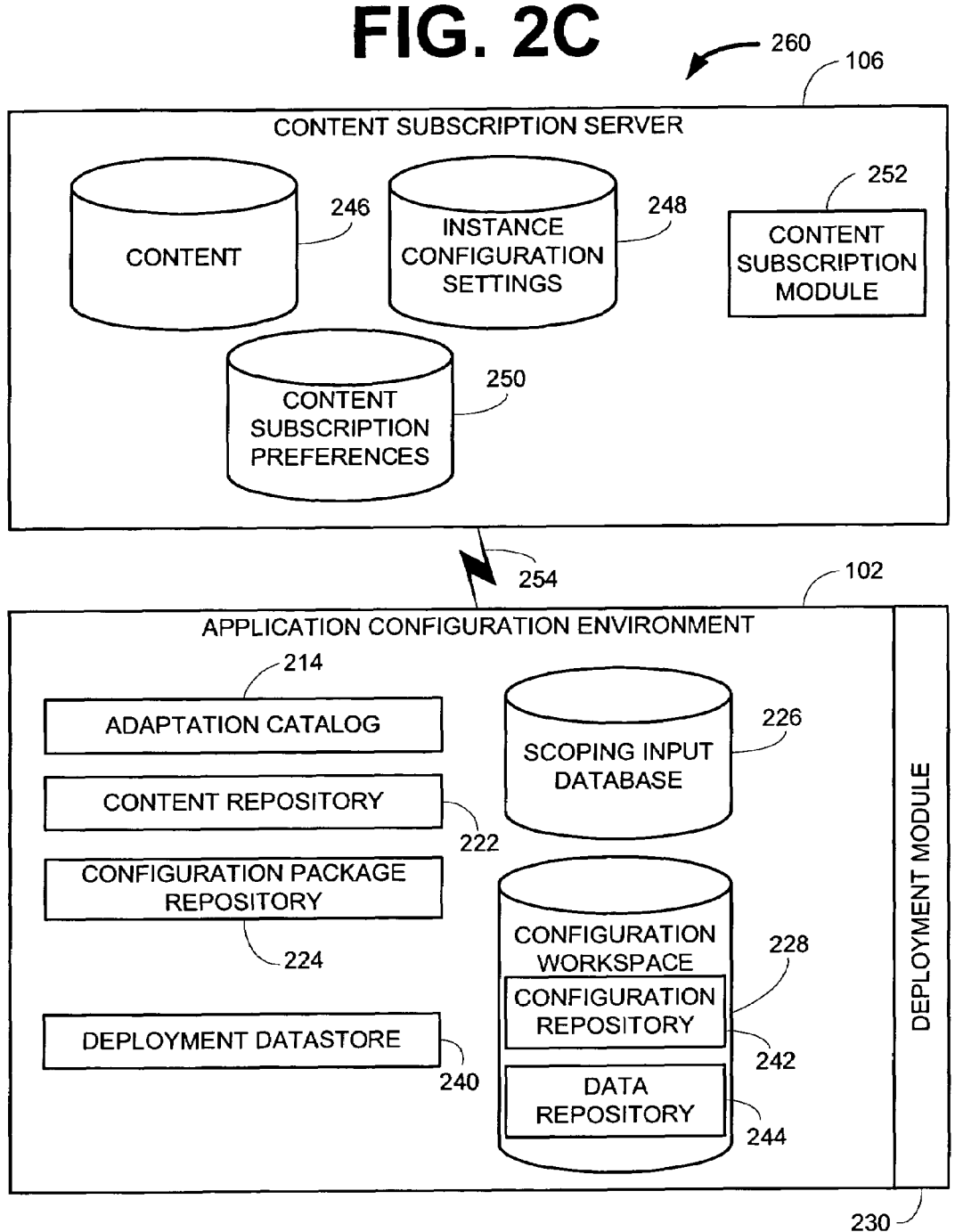

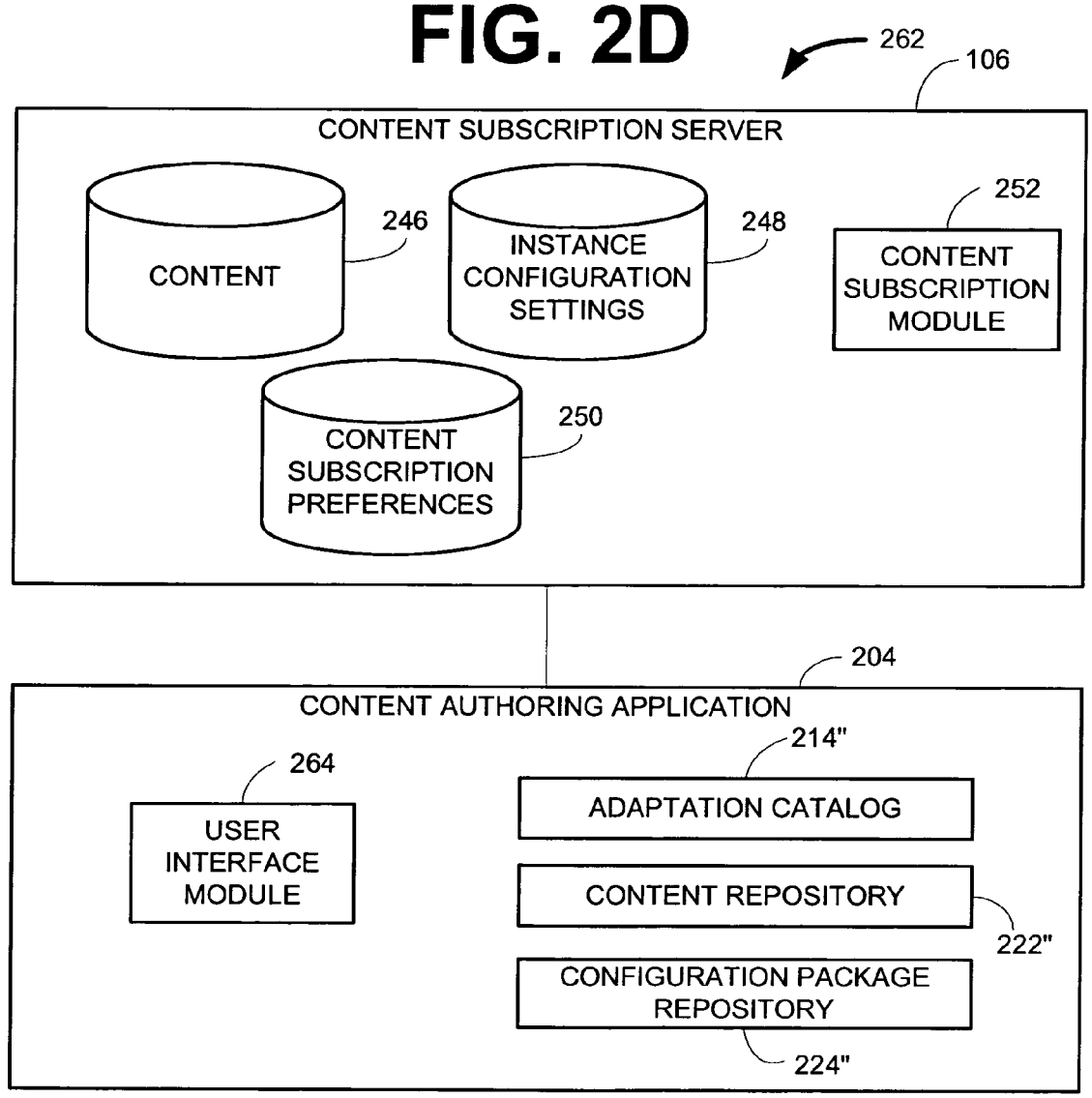

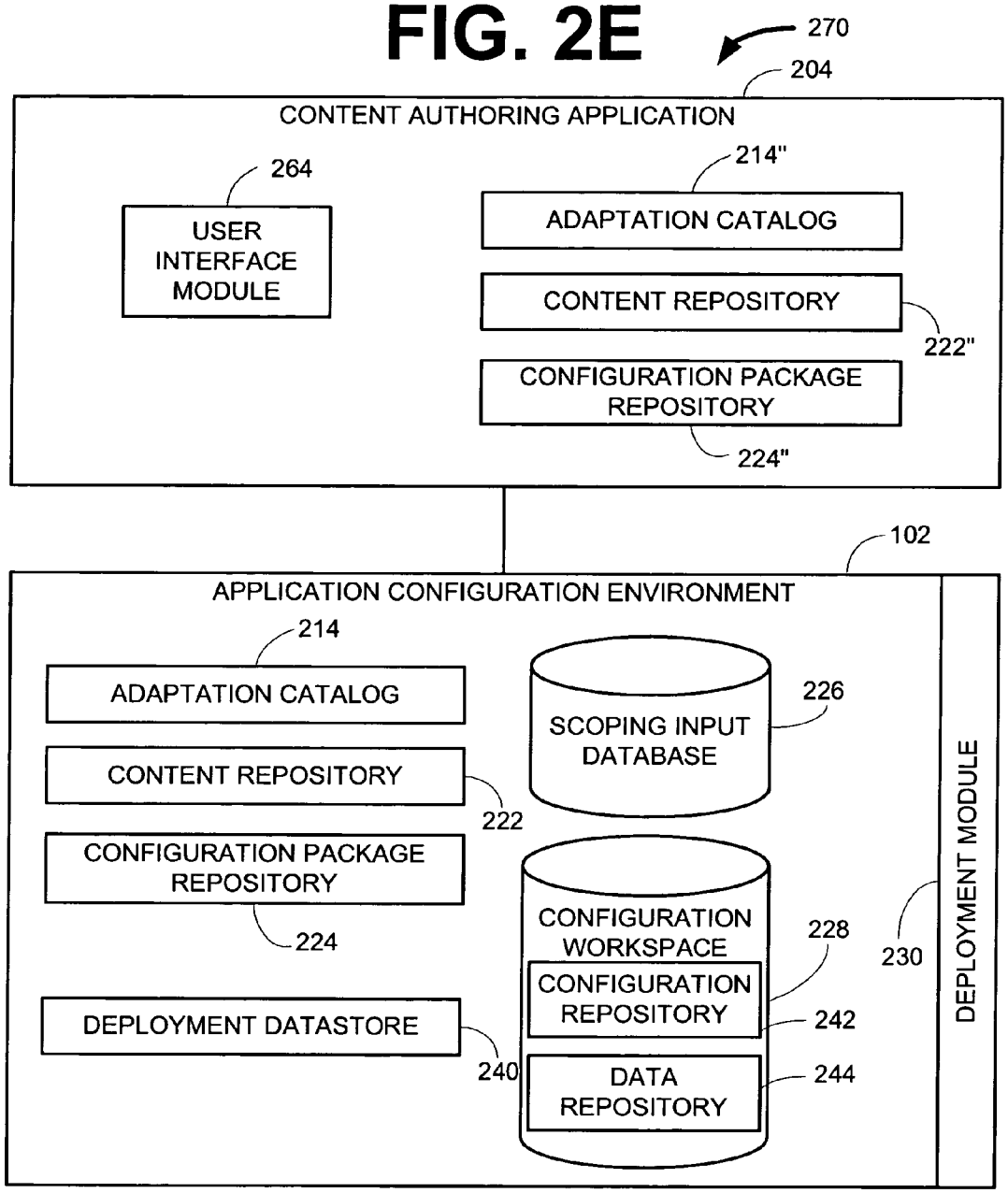

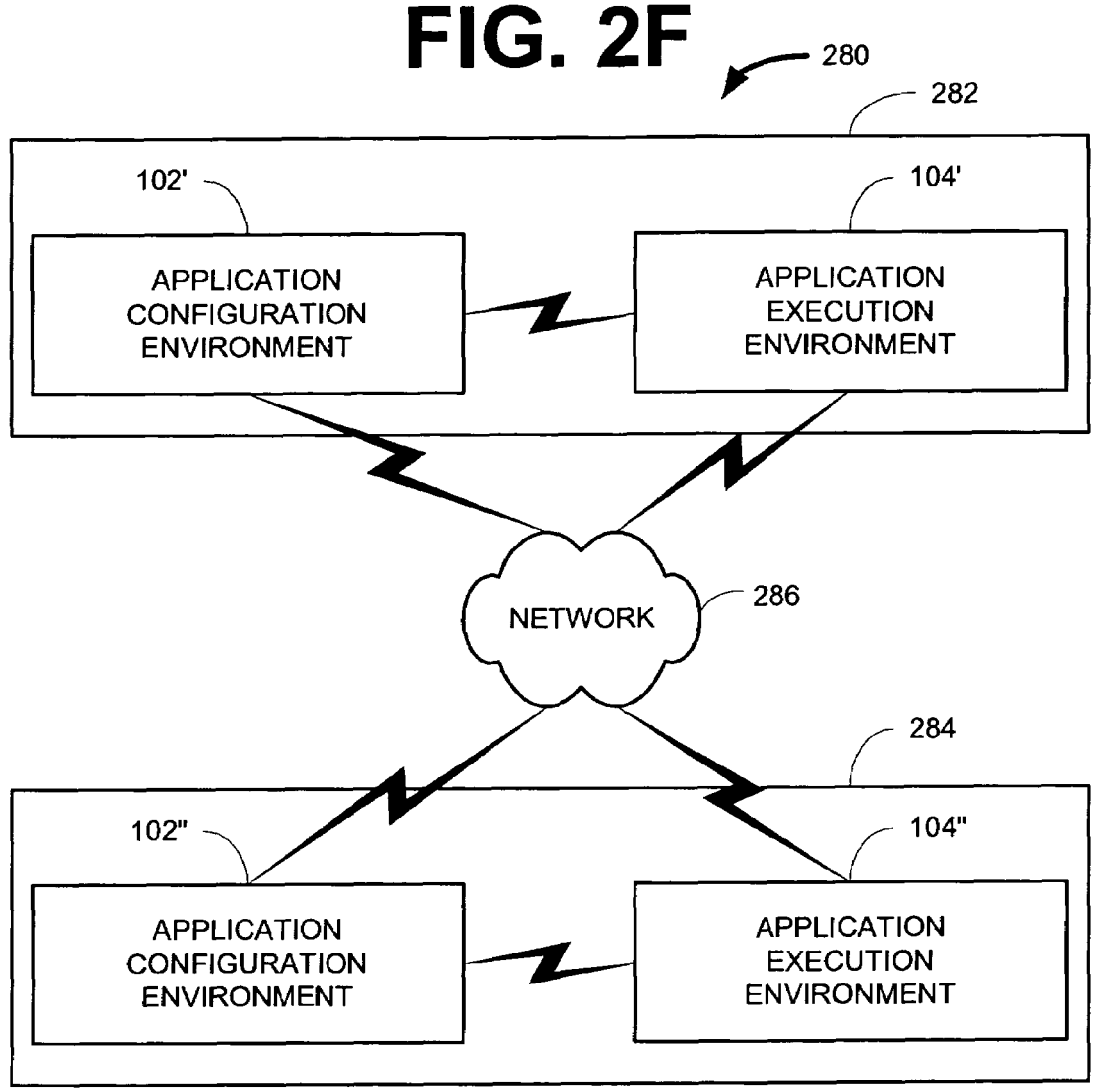

FORMULAR UPDATE

TECHNICAL FIELD

The subject mater relates to software application collaboration and, more particularly, collaboration between software applications via formular updates.

BACKGROUND INFORMATION

Data is commonly exchanged between organizations utilizing several technologies such as electronic data interchange ("EDI"), file transfers, and other technologies. However, if a first party receiving data requests additional information be added to a typical data exchange, a second party providing the data may need to modify one or more applications that cause the data to be extracted from the second party's applications and data stores. Such second party application modifications commonly require the efforts of a computer programmer. These efforts can be costly and time consuming even if the second party is utilizing an instance of the same application as the first party.

BRIEF DESCRIPTION OF THE DRAWINGS

FIG. 1 is a block diagram of a system according to an example embodiment.

FIG. 2A is a block diagram of a system according to an example embodiment.

FIG. 2B is a block diagram of a system according to an example embodiment.

FIG. 2C is a block diagram of a system according to an example embodiment.

FIG. 2D is a block diagram of a system according to an example embodiment.

FIG. 2E is a block diagram of a system according to an example embodiment.

FIG. 2F is a block diagram of a system according to an example embodiment.

DETAILED DESCRIPTION

Figure 3:
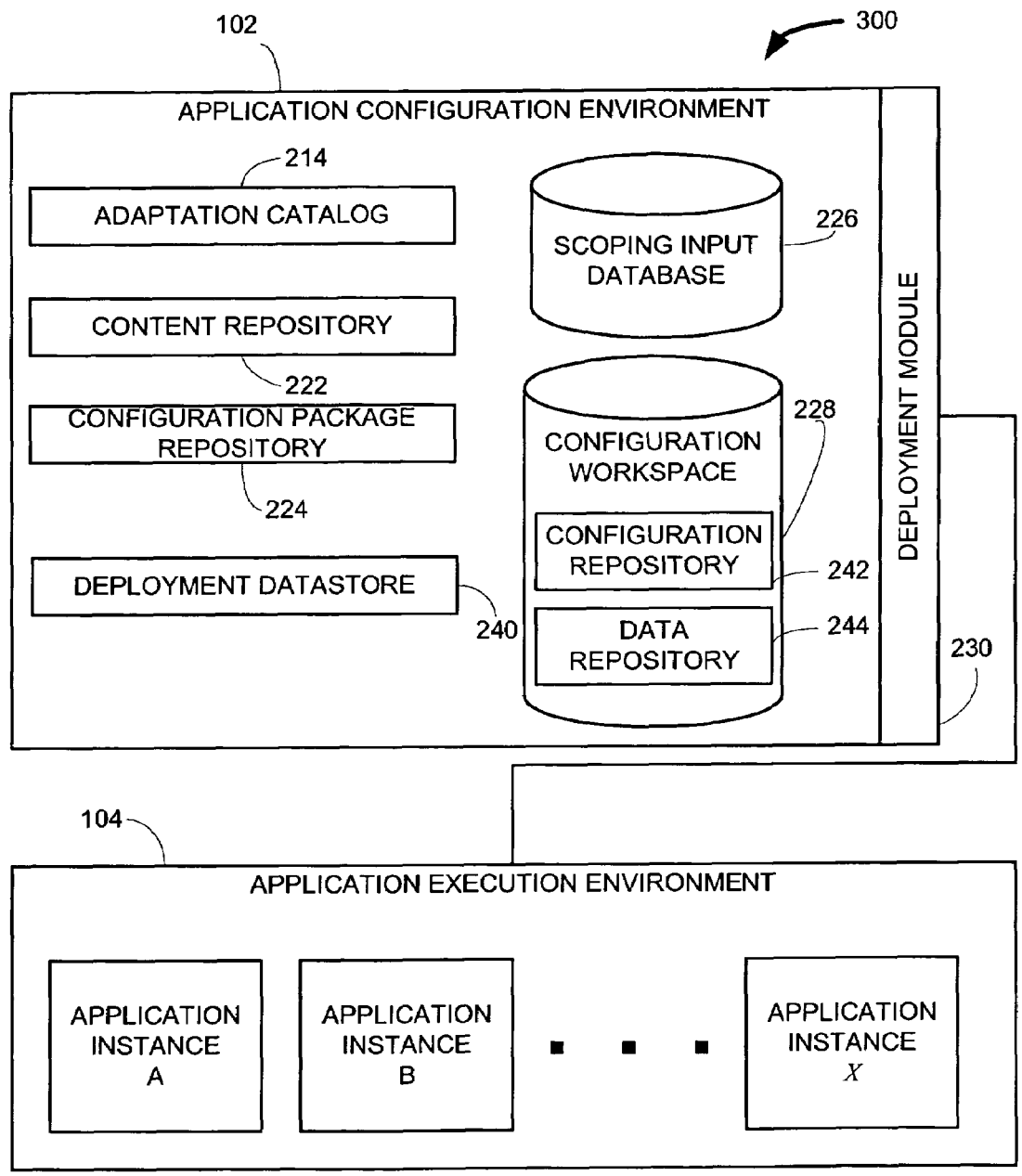
FIG. 3 is a block diagram of a system according to an example embodiment.

The various embodiments described herein provide systems, methods, and software to facilitate data exchange between application instances. In some such embodiments, a first party authors an item of content for an application that may execute within an instance of the application of a second party. The item of content may then be distributed to the second party and utilized within the application instance of the second party to extract data in a format defined within the item of content. In some such embodiments, the item of content may further be configured to communicate the data to the first party.

In some embodiments, the content item may be distributed to the second party by one of several modes. The modes of distribution may include emailing the content item, placing the content item on a web page for download by the second party, sending the content item encoded on a computer readable medium such as a CD-ROM or other tangible medium, publishing the content item to a content subscription server, or other modes of distribution capable of causing the content item to be received by the second party.

In some embodiments, publishing the content item to a content subscription server includes publishing the content item along with metadata that can be utilized by the content subscription server to identify one or more application instances of one or more second party's that the content item is intended for, or otherwise needed by. The content subscription server may be configured to identify the one or more second party application instances by evaluating the content item metadata in view of one or more of application instance scoping information and representations of application instances stored on or otherwise accessible to the content subscription server. In some embodiments, the content subscription server may also be configured to distribute the content item according to second party content subscription preferences.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, electrical, or other changes may be made without departing from the scope of the inventive subject matter. Such embodiments of the inventive subject matter may be referred to, individually and/or collectively, in the present application by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described in the present application are implemented in hardware, software or a combination of software and hardware in one or more embodiments. The software comprises computer executable instructions stored on computer readable media such as memory or other type of storage devices. The term "computer readable media" is also used to represent carrier waves on which the software is transmitted. Further, such functions correspond to modules, which may include one or a combination of software, hardware, or firmware. Multiple functions may be performed in one or more modules as desired, and the embodiments described are merely examples. The software may be executed on a digital signal processor, ASIC, microprocessor, or other type of processor operating on a system, such as a personal computer, server, a router, or other device capable of processing data including devices interconnected by a network.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a block diagram of a system 100 according to an example embodiment. The system 100 includes an application configuration environment 102, an application execution environment 104, and a content subscription server 106.

The application configuration environment 102 is a system 100 environment within which an application may be configured. However, the application will, or does, execute within the application execution environment 104. In some embodiments, this arrangement of the application configuration environment 102 and the application execution environment 104 separates the configuration of an application from the environment within which it executes. When an application configuration has been established, all or part of the configuration may then be deployed to the application execution environment 104. This deployment may occur to one or more separate instances of the application in the application execution environment 104. Although only a single application execution environment 104 is illustrated, multiple application execution environments 104 may exist, and the deployment may be made to one or more of the multiple application execution environments 104.

The content subscription server 106 receives content updates and new content from content authors, or through a content authoring process, then publishes the content to the content subscription server 106. When content is published to the content subscription server 106, the content typically includes metadata identifying what portions of an application the content is relevant to or otherwise has an effect upon. In some embodiments, the metadata identifies a version of an item of content, such as version 2.0 of a previously existing item of content. In such instances, the new version of the content is backward compatible with previous versions of the application instance to ensure that new content does not adversely affect a previously stable application instance.

In some embodiments, content may be published to the content subscription server 106 by a party for distribution to one or more business partners of the party. In some such instances, the metadata of the content includes information that identifies, or can be utilized to identify, one or more business partner application instances to distribute the content to.

The content subscription server 106 further includes a database, or has access to a database, including data representative of application instance configurations. In some such embodiments, the data representative of the application instance configurations includes data representative of content deployed to the respective application instances.

The content subscription server 106 typically further includes a content subscription module that evaluates the metadata of received content updates and new content. As mentioned above, this metadata identifies application portions of the application the content is relevant to or otherwise has an effect upon. The content subscription module may then query the database including the representations of application instance configurations to determine which application instances the new content is relevant to. The new content may then be distributed to the application configuration environments of the identified application instances. The application configuration environment may then deploy the new content.

In some embodiments, the content subscription server 106 further includes a database of content subscription preferences. In some such embodiments, when an application instance is instantiated, an application administrator, or other individual, sets up a content subscription. A content subscription includes a specification of content subscription preferences that are stored in the content subscription preference database. These preferences identify how to handle new content when new content is published to the content subscription server 106.

In some embodiments, the content subscription preferences specify that new content that is identified by the content subscription module to be relevant to the application instance be pushed to the application configuration environment 102 over a network, such as the Internet. In some such embodiments, when new content is pushed to the application configuration environment, a content subscription preference specifies that the new content be automatically deployed to the application execution environment 104 by a deployment process. In other embodiments, the preferences specify that the pushed content is to be stored in an administrator inbox. In these embodiments, the administrator, or other individual will manually instruct the deployment module to deploy the new content. In some other embodiments, a content subscription preference specifies for the new content to be placed in a new content inbox. The new content inbox may be located on the content subscription server 106 or other server from which the new content can be accessed for download.

FIG. 2A is a block diagram of a system 200 according to an example embodiment. The system 200 includes a configuration scoping application 202, the application configuration environment 102, the content authoring application 204, and the content subscription server 106.

The configuration scoping application 202 typically is a software tool that executes on a computing device, such as a portable computer, on a same computing device within which the application configuration environment 102 exists, or on another computing device that can be communicatively coupled to the application configuration environment 102.

The configuration scoping application 202, when executed, typically presents a set of scoping questions to a user. The scoping questions may be linked to one of many adaptation catalog entries. The adaptation catalog entries may include a representation of all of the solution capabilities of an application to be configured, and eventually executed. In some embodiments, the solution capabilities are hierarchically divided into areas, packages, topics, and options. There may be multiple areas, and each area may have multiple packages. Each package may have multiple topics, and each topic may have multiple options.

In some embodiments, such as in an example embodiment where the application to be configured is an ERP application, the adaptation catalog may provide in the area Sales, a package Customer Order Management that contains the topics Sales Order Quote, Sales Order, Sales Order Analysis, and others. On that level, one or more options typically exist such as Approval Processing.

In the configuration scoping application 202, as stated above, scoping question may be linked to an adaptation catalog entry. An adaptation catalog entry further includes a rule. These rules typically model dependencies between the areas, packages, topics, and options and corresponding solution capabilities of the application. A rule may specify required inclusion or exclusion of other areas, packages, topics, or options, or may require specification of further areas, packages, topics, or options. A rule may also specify a recommendation or default area, package, topic, or option.

For example, a first example scoping question, "What is the primary focus of your business?" may have three possible answers including "Sales," "Service," and "Logistics." Such a first scoping question typically is aimed at identifying an area of business in which the application is going to be used. Answering "Sales" typically tells the configuration scoping application 202 that the area is "Sales" and a rule tied to the adaptation catalog entry for "Sales" specifies dependencies with packages, topics, and options and the corresponding solution capabilities of the application necessary or optional in using the application in a sales business. Such a rule can also specify that other packages, topics, and options and the corresponding solution capabilities be excluded.

In some embodiments, one or more scoping questions exist to identify business partners of an organization that will, or does, utilize the application. In some such embodiments, business partners may represented in one or more adaptation catalog entries. These business partner adaptation catalog entries may further include rules that recommend or require inclusion of one or more areas, packages, topics, or options within an application configuration. In some such instances, application capabilities associated with one or more required or recommended areas, packages, topics, or options are needed, or recommended, if the organization does business with one or more other business partners. These capabilities may facilitate collaboration between the organization and the one or more business partners, such as through data interchange between applications.

Thus, when a user answers scoping questions, the configuration of the application is being performed. Further, when a question is answered that is associated with an adaptation catalog entry having a rule that excludes another area, package, topic, or option, that rule may be applied to eliminate questions from consideration. Conversely, when a question is answered that is associated with an adaptation catalog entry having a rule that requires another area, package, topic, or option, that same rule may be applied to determine a next question, or group of questions, to ask a user. However, in the event that a question is not answered that is linked to a rule providing defaults, the question may be skipped without adversely affecting the application configuration.

In some embodiments, the answers to the scoping question answers may be stored in a location accessible to the content subscription server 106. This may include storing the scoping question answers on the content subscription server 106 and the content subscription server 106 being able to access the scoping question answers within the application configuration environment 102.

The answers to the configuration scoping questions may be used by a content subscription module process to identify new and updated content that is relevant to one or more application instances. The identification of new and updated content that is relevant to one or more application instances may occur when the new or updated content includes new functionality not previously linked to a scoping question answer in the adaptation catalog.

The content authoring application 204 typically provides a set of tools to author content. The set of tools may be provided by the content authoring application 204 through one or more user interfaces. The content authoring application 204, in some embodiments, may be a standalone application. In other embodiments, the content authoring application 204 is configured to execute on a computing device operatively coupled to the content subscription server 106 and one or more application configuration environments 102. In other embodiments, the content authoring application 204 may be a portion of a larger application and does not require a connection to the content subscription server 106 or the application environment 102.

Content that may be created, modified, and deleted using the tools of the content authoring application 204 typically includes adaptation catalog entries, forms, user interfaces, reports, communication specifications, documentation, and other content that may be used in an application when deployed. In some embodiments, a communication specification may include an XML schema, an EDI schema and connectivity information, mappings between file layouts and application data storage mechanisms, such as databases, or other similar communication specifications.

In some embodiments, the content that may be created, modified, and deleted using the tools of the content authoring application 204 may also include content created by a first party to be distributed to second party business partners. In some embodiments, such content may include processes configured to extract data from a second party application and communicate the extracted data to the first party. In some embodiments, the content may include a user interface and data definitions created by the first party that may be deployed to and utilized within an application of one or more second parties. In some such embodiments, the content from the first party may also include one or more test cases that may be executed by a test engine to test the functionality of one or more items of content from the first party. These embodiments, and others, may be utilized to facilitate collaboration between applications of the first party and one or more second parties.

FIG. 2B is a block diagram of a system 210 according to an example embodiment. The system 210 includes a portable computing device 232 including a configuration application 236, an application configuration dataset 234 stored in a memory, an application transaction dataset 238 and the configuration scoping application 202. The system 210 further includes the application configuration environment 102. Although the application configuration environment 102 is not illustrated within the portable computing device 232, in some embodiments, the application configuration environment 102 does reside within the portable computing device 232. In other embodiments, the application configuration environment 102, the configuration scoping application 202, the application configuration dataset 234, the configuration application 236, and the application transaction dataset 238 all reside on a computing device other than the portable computing device 232.

The configuration application 236, in some embodiments, typically provides a set of tools via user interfaces to a user. The tools of the configuration application 236 may allow the user to modify answers to scoping question answers stored in an input cache 220 of the configuration scoping application 202, the application configuration dataset 234, and the application transaction dataset 238. The application configuration dataset 234 may be populated with data copied from a configuration repository 242 stored within a configuration workspace 228 of the application configuration environment 102. The application transaction dataset 238 may be populated with data copied either from a demonstration dataset stored in data repository 244 of the configuration workspace 228 or from the content repository 222.

Although the input cache 220 is illustrated within the configuration scoping application 202, the input cache 220 may exist separate from the configuration scoping application 202 within a memory of the portable computing device 232. In such embodiments, the input cache 220 may be populated with data copied from the scoping input database 226.

For the sake of understandability regarding several portions of the configuration scoping application 202 and the application configuration environment 102, these portions of the system 210 will be discussed followed by a more detailed discussion of the configuration application 236.

The configuration scoping application 202, in some embodiments, includes a deduction engine 212 and an adaptation catalog 214'. In this embodiment, the configuration scoping application 202 further typically includes a solution proposal and estimate engine 216, a data migration planner 218, and the input cache 220.

The application configuration environment 102, in some embodiments, includes an adaptation catalog 214, a content repository 222, and a configuration package repository 224. In some such embodiments, the application configuration environment 102 further includes a scoping input database 226, a configuration workspace 118, a deployment module 230, and a deployment datastore 240.

The adaptation catalog 214 may include a representation of all of the solution capabilities of an application to be configured, and eventually executed. Each capability of an application to be configured is identified in an adaptation catalog 214 entry. The adaptation catalog 214 entries each may be identified as an area, package, topic, or option and may be organized in a hierarchy with a child identifying the parent. An example hierarchy is a "General Ledger" capability, which in some embodiments typically is a package having two topics, "cash based" and "accrual based" which are two application capabilities within the "General Ledger" capability.

The adaptation catalog 214 entries may further include scoping questions directed toward obtaining scoping information to determine what areas, packages, topics, and options are relevant to the user's needs. Additionally, the adaptation catalog entries typically include rules, the application of which may require inclusion or exclusion, or specify default inclusion or exclusion, of certain other areas, packages, topics, and options. Thus, because the areas, packages, topics, and options typically correlate to application capabilities, the inclusion, exclusion, and defaulting specifies what capabilities will be enabled and disabled in the application when deployed by the deployment module 230.

In some embodiments, rules and entries in the adaptation catalog may be linked to a configuration package that exists in the configuration package repository 224. A configuration package includes one or more configuration settings that enable or disable functionality of the application when deployed by the deployment module 230 or by a configuration process within the application configuration environment 102 when configuring the application within the configuration workspace 228. A configuration package can further be linked to one or more content items or content item definitions stored in the content repository 222. Some such content types include report layouts, forms, user interfaces, communication specifications, documentation, and other content that can be used in an application when deployed. A communication specification can include an XML schema, an EDI schema and connectivity information, mappings between file layouts and application data storage mechanisms, such as databases, and other similar communication specifications.

The rules of adaptation catalog 214 entries may also be used by the deduction engine 212 of the configuration scoping application 202. The configuration scoping application 202 typically presents a user interface to a user that requests answers to questions. The questions to be asked via the user interface may be identified by the deduction engine 212 based on the adaptation catalog 214'. The adaptation catalog 214' is typically a copy of the adaptation catalog 214 from the application configuration environment 102. When an answer is received by the configuration scoping application 202 through the user interface, the answer may be stored in the input cache 220 of the configuration scoping application 202. The deduction engine 212 may then apply the rule associated with the adaptation catalog 214' entry of the question asked to the received answer. Through the application of the rule, in view of answers already received and rules already applied, the deduction engine 212 typically identifies a next question to ask. The identified question may then be presented to the user through the user interface. This process typically continues until either all of the questions have been asked, the user is out of time, or otherwise chooses to stop. If questions remain that have not been answered, the process may be continued at a later time or rules specifying default areas, packages, topics, and options typically supply enough information to allow deployment of the application in a functional form.

In some embodiments, the configuration scoping application 218 may further include a data migration planner 218. In such embodiments, one or more additional scoping questions may be asked. These additional scoping questions are typically directed toward obtaining information from the user about legacy systems and how data is stored within them. In some embodiments, the questions simply may ask what systems are currently in use. In other embodiments, the questions may be more detailed to obtain information such as what type of database an application is utilizing and what type of customization has been made or custom applications developed. The data migration planner 218 may then use the answers to these additional questions to propose a data migration plan to the new application.

In some embodiments, the configuration scoping application 202 includes a solution proposal and estimate engine 216. The solution proposal and estimate engine 216 may be used in a sales situation. For example, if a sales person is discussing with a sales lead what a certain application product can do for the sales lead, the sales person typically can utilize the configuration scoping application 202 to obtain information about the needs of the sales lead via the scoping questions. The scoping question answers may then be utilized by the solution proposal and estimate engine 216 to make an initial determination of what will be involved if the sales lead decides to purchase the application. The solution proposal and estimate engine 216 normally is configured to output information for the sales lead to make several determinations, such as the size of effort necessary to implement or transition to the application from legacy system, the cost involved, and cost. In some embodiments, the output of the solution proposal and estimate engine 216 outputs one or more of an implementation cost estimate, an application solution proposal, and a recommended project roadmap. In some embodiments, the solution proposal and estimate engine 216 outputs a proposal for one or more other options, application descriptions, sales literature, benefit statements of using the application, and addition documents, such as a proposal of key performance indicators the application can monitor to assist in managing the application or enterprise of the sales lead.

After the scoping question have been answered, the answers, and any other information obtained from a sales lead or other user of the configuration scoping application 202, the information typically is uploaded to the application configuration environment 102. However, in embodiments, where the configuration scoping application 202 executes on the same computing device as the application configuration environment 202, the scoping question answers and other information may be stored directly to the application configuration environment 102.

When the configuration question answers and other information is uploaded, or otherwise stored to the application environment 102, the scoping question answers are stored to the scoping input database 226. The scoping question answers, in some instances, will be referred to interchangeably as the "scoping information."

After the scoping information is within the scoping input database 226, a process within the application configuration environment 102 typically executes to begin configuring an application in the configuration repository 242 of the configuration workspace 228. The configuration repository 242 may include a set of configuration tables that mirror, at least in part, the configuration tables of the application. The configuration repository 242 may include a set of configuration tables for each of multiple instances of the application to allow use of the application configuration environment 102 to configure multiple application instances.

The process that configures the application may be configured to determine one or more configuration packages to instantiate in the configuration repository 242. Configuration packages, in some embodiments, may include one or a set of configuration settings to enable or disable certain capabilities of the application. Configuration packages, as mentioned above, may be linked to adaptation catalog 214 entries and rules associated with adaptation catalog entries. Thus, the process that configures the application in the configuration repository 242 may be configured to query the scoping information in the scoping input database 226 to identify configuration packages to instantiate.

In some embodiments, demonstration data may exist to facilitate instantiation of a demonstration instance of the application for a sales lead, training session, or other purpose. The demonstration data, in some embodiments, is linked to one or more configuration packages from the configuration package repository 224. The demonstration data typically exists in the content repository 222 so that it can be copied into a set of application tables in the data repository 244 of the configuration workspace 228. These tables may hold such data as transactional data, operational data, master data, or other data that can exist in the application when the application is ready for execution or is executed.

Once the demonstration data is copied to the data repository 244, that data may be fine-tuned to more closely match the intended use of the demonstration data. For example, the system may be configured so that a sales person, or other individual, can fine-tune demonstration data values to more closely match a sales lead's expectations of the application. Such fine tuning may include modifying sales order documents in the demonstration data to include a name, address, and logo of the sales lead's enterprise, or other similar modifications to the demonstration data.

Some embodiments of the application configuration environment 102 may further include the deployment datastore 240. The deployment datastore 240 typically stores a representation of one or more application configurations of applications that have been deployed. The representations of the one or more application configuration may be stored or updated in the deployment datastore 240 by the deployment module 230 upon successful deployment of an application.

A representation of an application configuration typically includes data representative of the application configuration settings. In some embodiments, the representation may further include data representative of content deployed to the application.

The deployment datastore 240, in some embodiments, may be updated upon each configuration or content modification of a deployed system. In some embodiments, the deployment datastore may further include a versioning mechanism that maintains not only a current configuration representation, but also historical representations.

In some embodiments, the deployment datastore 240, or a current copy thereof, may be maintained by an entity that developed, or otherwise offers for sale, the application. The deployment datastore 240 may be used by the entity to monitor current application usage, perform billing processes as a function of a current application configuration, provide application upgrade information based on portions of the application or content utilized, and for other purposes. In some embodiments, the entity may provide application updates, bug fixes, or other upgrades directly to a deployed application instance. Such updates, bug fixes, or other upgrades may be identified as relevant to a particular application instance as a function of the configuration representation in view of adaptation catalog 214 entries.

As described above, the configuration application 236, in some embodiments, may provide a set of tools via user interfaces to a user. The tools of the configuration application 236 typically allow the user to modify answers to scoping question answers stored in an input cache 220, the application configuration dataset 234, and the application transaction dataset 238. The application configuration dataset 234 may be populated with data copied from the configuration repository 242. The application transaction dataset 238 may be populated with data copied from either a demonstration dataset stored in the data repository 244 or from the content repository 222. The input cache 220, if separate from the configuration scoping application 202 may be populated with scoping information copied from the scoping input database 226.

Through use of the configuration application 236 user interfaces, a user may modify data within the application transaction dataset 238 to customize the data used of a demonstration application to more closely reflect how a sales lead's enterprise will use the application. For example, through modifying the transaction data, data displayed within the demonstration may include orders with products, customers, addresses, countries, and other details that truly reflect those of the sales lead's enterprise.

Further, use of the configuration application 236 user interfaces may also allow a user to further refine an application configuration to more closely match the needs of a customer or sales lead. This can include a user taking a copy of an application configuration to work on while away from a connection to the application to be configured or application configuration environment 102, such as when traveling.

In some embodiments, the configuration application 236 may further include a warehouse-modeling module. The warehouse-modeling module may include a deduction engine 212 and a subset of an adaptation catalog 214 as discussed above, or may leverage the deduction engine 212 and adaptation catalog 214' of the configuration scoping application 202 if present on the portable computing device 232. In such embodiments, the adaptation catalog 214 (or 214') may further include one or more area, package, topic, option hierarchies of adaptation catalog 214 entries. The user may answer scoping questions to identify and define a warehouse layout and processes utilized within a warehouse to be modeled. Such warehouse modeling data, once defined, may be copied to the data repository. In some embodiments, such information is similar to configuration settings as a warehouse layout is not subject to frequent change. However, warehouse layouts are generally unique to each warehouse. Thus, warehouse data may be stored in the data repository and may be deployed to an application data table instead of a configuration table.

FIG. 2C is a block diagram of a system 260 according to an example embodiment. The system 260 includes the application configuration environment 102 as described above with reference to FIG. 1, FIG. 2A, and FIG. 2B. The system 260 further includes the content subscription server 106 as described above with reference to FIG. 1 and FIG. 2A, but provides greater detail with regard to the various elements of the content subscription server 106 according to some embodiments.

The content subscription server 106 may include a content database 246, a database of application instance configurations 248, a database of content subscription preferences, and a content subscription module 252. Some further embodiments may also include a copy of the scoping input database

226. Yet further embodiments may include an inbox module providing a location to place new content for download by an administrator or process of an application configuration environment 102.

The content subscription server 106 is typically operatively coupled to the application configuration environment 102. In some embodiments, the coupling of the content subscription server 106 to the application configuration environment 102 may be made over a network connection 254 between the computing systems upon which they operate. In some embodiments, the network connection 254 is an Internet connection. In other embodiments, the network connection 254 may a connection to one or more of a variety of networks including a local area network ("LAN"), a wide area network ("WAN"), a value added network ("VAN"), a peer-to-peer network ("P2P"), or other suitable network providing data exchange functionality.

The content database 246 typically is a location to which new content is published. Content published to the content database 246 is content that may be processed by the content subscription module 252 and pushed, or otherwise made available, to one or more application instances via their respective application execution environments. As mentioned above, when content is published, the content may include metadata identifying what portions of an application the content is relevant to or otherwise has an effect upon.

The instance configuration settings database typically includes data representative of application instance configurations. In some such embodiments, the data representative of the application instance configurations may include data representative of content deployed to the respective application instances.

The content subscription module 252 typically evaluates the metadata of the content published to the content database. The content subscription module may then query the instance configuration settings database 248 to determine which application instances the new content is relevant to. The new content may then be distributed to the application configuration environments of the identified application instances. The application configuration environment may then deploy the new content.

In embodiments that include a copy of the scoping input database 226, the content subscription module 252 is typically configured to evaluate the scoping information to determine if the published content is relevant to one or more application instances. Depending on the metadata of the published content, this evaluation may identify content relevant to an application instance not identified by the evaluation of the instance configuration settings database 248. Such an identification may occur when a new item of content is published that was not included in the representation of the application instance configuration settings. Such an identification may also occur when the published content is an item of previously existing content whose metadata has been modified.

In embodiments including the content subscription preferences database 250, when an application instance is instantiated, an application administrator, or other individual, may set up a content subscription. A content subscription may include a specification of content subscription preferences that are stored in the content subscription preference database 250. These preferences typically identify how to handle new content when new content is published to the content database 246.

In some embodiments, the content subscription preferences may specify that new content identified by the content subscription module 252 to be relevant to the application instance be pushed to the application configuration environment 102. In some such embodiments, when new content is pushed to the application configuration environment, a content subscription preference may specify that the new content be automatically deployed to the application execution environment 104 by the deployment module 230. In other embodiments, the preferences may specify that the pushed content is to be stored in an administrator inbox. In these embodiments, the administrator, or other individual may manually instruct the deployment module 230 to deploy the new content. In some other embodiments, a content subscription preference may specify for the new content to be placed in a new content inbox. The new content inbox may be located on the content subscription server 106 or other server from which the new content may be accessed for download. In such instances, an application instance administrator may receive a message including a new content notice. The administrator may then go to the designated download location and download the content. The content may then be manually or automatically deployed by the deployment module 230.

In some embodiments, the subscription preferences may specify that new content be sent to an application instance administrator on a computer readable medium, such as via an email, on a computer disk, or other suitable medium. In such instances, the new content may be copied from the computer readable medium to the application configuration environment 102 and deployed in due course.

FIG. 2D is a block diagram of a system 262 according to an example embodiment. The system 262 includes the content subscription server 106 as described above with reference to FIG. 1, FIG. 2A, and FIG. 2C. The system 262 further includes the content authoring application 204 as described above with reference to FIG. 2A, but provides greater detail with regard to the various elements of the content authoring application 204 according to some embodiments.

The content authoring application 204 typically includes a user interface module 264, an adaptation catalog 214", a content repository 222", and a configuration package repository 224". The adaptation catalog 214", the content repository 222", and the configuration package repository 224" typically are the originating sources of this data described elsewhere herein. Content, including adaptation catalog entries, configuration packages, and other content, may be authored, modified, and deleted utilizing one or more user interfaces of the user interface module 264.

When a user creates, modifies, or deletes content utilizing the content authoring application 204, the content is typically stored into or deleted from the adaptation catalog 214", the content repository 222", and the configuration package repository 224". Note that adaptation catalog 214" entries and configuration packages stored in the configuration package repository 224" are both content types. Thus, when content is referred to in the present application, unless explicitly excluded or otherwise called out, adaptation catalog 214" entries and configuration packages are included.

In some embodiments, after the content is stored, the content may be verified via quality control processes of the organization utilizing the content authoring application. The content may then be published the content database 246 of the content subscription server 106. The content subscription server 106 may then operate upon the new content to distribute it. In some embodiments, the content may be part of a baseline application that may be instantiated for new application instances.

In some embodiments, content authored using the content authoring application 204 can be distributed according to one or more modes other than through the content subscription server 262. In various embodiments, content may be emailed, downloaded, or sent via a computer readable medium with the content encoded thereon or therein. In some embodiments, content items can be distributed by a first party to an application configuration environment or application instance of a second party.

In some embodiments, content created using the content authoring application 204 includes content created by one party to facilitate conformance by a second party with a data formatting or interchange standard of the first party. Such content may include data input content, such as a user interface developed by the first party to facilitate the second party taking orders for a product of the first party. In other embodiments, such content can include a data extraction process developed by the first party for use within an application of the second party. This data extraction process may extract data from an application or data storage location of the second party and cause that data to be formatted in manner to facilitate insertion of the extracted data into an application or other data store of the first party. The data extraction process may further be configured to cause the extracted, formatted data to be communicated to the first party. Such content, in yet further embodiments, may include a process to facilitate the second party receiving data from the first party.

These embodiments that may include the capability of a first party to create and distribute content to an application of a second party, may be utilized to facilitate collaboration between the parties. These embodiments allow the second party to meet the data requirements or needs of the first party by merely utilizing another item of content. Thus, the first party can create one or more content items to distribute to one or more second parties. The one or more content items only need to be deployed to the application instances of the second parties and the parties become compliant with the needs or requirements of the first party. Distribution of such content items may significantly reduce the burden on the second parties to meet the data processing needs or requirements of the first party.

FIG. 2E is a block diagram of a system 270 according to an example embodiment. The system 270 includes the content authoring application 204 as described above with reference to FIG. 2A and FIG. 2D. The system 270 further includes the application configuration environment 102 as described above with reference to FIG. 1, FIG. 2A, FIG. 2B, and FIG. 2C.

In some embodiments of the system 270, content is typically stored directly to the application configuration environment 102. This storing may include copying one or more of the adaptation catalog 214", content repository 222", and configuration package repository 224" from the content authoring application 204 to the adaptation catalog 214, content repository 222, and configuration package repository 224 of the application configuration environment 102.

FIG. 2F is a block diagram of a system 280 according to an example embodiment. The system 280 includes a first partner application instance 282 and a second partner application instance 284 connected via a network 286. In some embodiments, the network 286 includes one or more of the Internet, a virtual private network ("VPN"), a wide area network ("WAN"), a value added network ("VAN"), a local area network ("LAN"), a public switched telephone network ("PSTN"), or other network capable of carrying data encoded signals.

In some embodiments, each of the first partner application instance 282 and the second partner application instance 284 include an application configuration environment 102' and 102" and an application execution environment 104' and 104".

The first partner application instance 282, in some embodiments, includes the content authoring application 204 as discussed above. Content authored using the content authoring application may be distributed by the first partner application instance 282 over the network 286 to the application configuration environment 102" of the second partner application instance 284. Upon receipt of content in the application configuration environment 102" of the second partner application instance 284, the content may be deployed to and utilized within the application execution environment of the second partner application instance 284. In some embodiments, data from the application execution environment 104" of the second partner application instance 284 may be sent to the application execution environment 104' of the first partner application instance 282 over the network 286.

FIG. 3 is a block diagram of a system 300 according to an example embodiment. The system 300 includes the application configuration environment 102 as discussed above. The system 300 further includes the application execution environment 104.

The application execution environment 104 is a data processing environment within which an application, or an application to be deployed, may execute. When deploying an application, the deployment module 230 typically needs to know what application execution environment 104 and what application instance within that environment to deploy to. In embodiments including only one application execution environment 104, the application execution environment 104 may already be known. Similarly, in an application execution environment including only a single application instance, the instance may already be known.

Each instance of the application (i.e., application instances A, B, . . . X) typically includes a set of identical configuration tables which may include distinct configuration settings from one another. In some embodiments, multiple instances of the application may exist such as to provide a development instance, a test instance, and a production instance. In such embodiments where there are multiple application instances, the deployment module 230 may deploy the configuration settings from one of the application instances in the application execution environment 104 to another application in the same or another application execution environment 104. Although the deployment module 230 is illustrated as being a part of the application configuration environment 102, the deployment module 230, in other embodiments, may be a standalone application or a part of another application or process.

Figure 4:
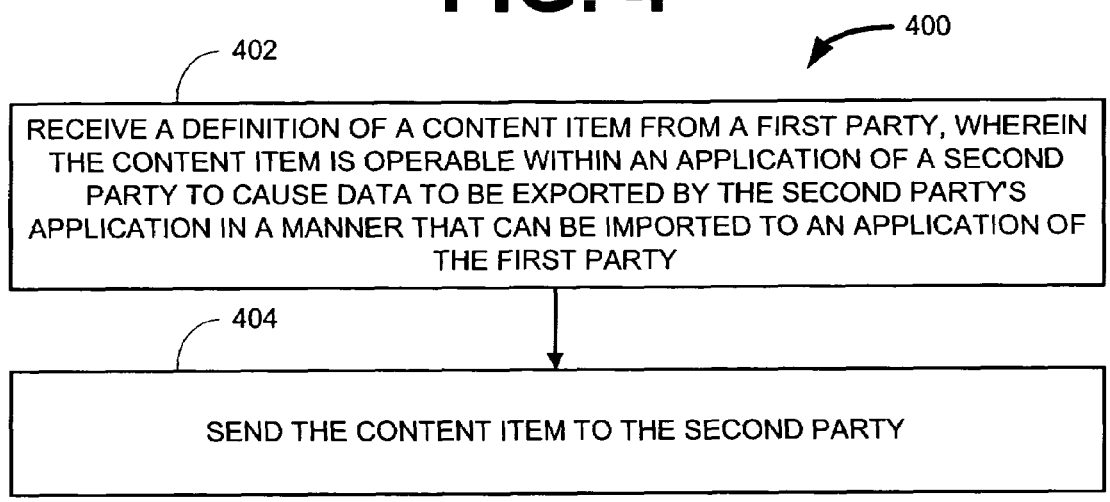
FIG. 4 is a flow diagram of a method according to an example embodiment.

FIG. 4 is a flow diagram of a method 400 according to an example embodiment. The example method 400 includes receiving a definition of a content item from a first party, wherein the content item is operable within an application of a second party to cause data to be exported by the second party's application in a manner that can be imported to an application of the first party 402 and sending the content item to the second party 404. In some embodiments, the content item may include a data format definition.

In some further embodiments, the content item is further configured to be operable within the second party's application to cause data exported from the second party's application to be communicated to the first party's application. The data may be communicated by second party's application to the first party's application over a network, such as the Internet or other network capable of carrying a data encoded signal between two network nodes.

In some embodiment of the method 400, importing data to the first party's application may include generating records within a database of the first party's application as a function of data exported from the second party's application.

Figure 5:
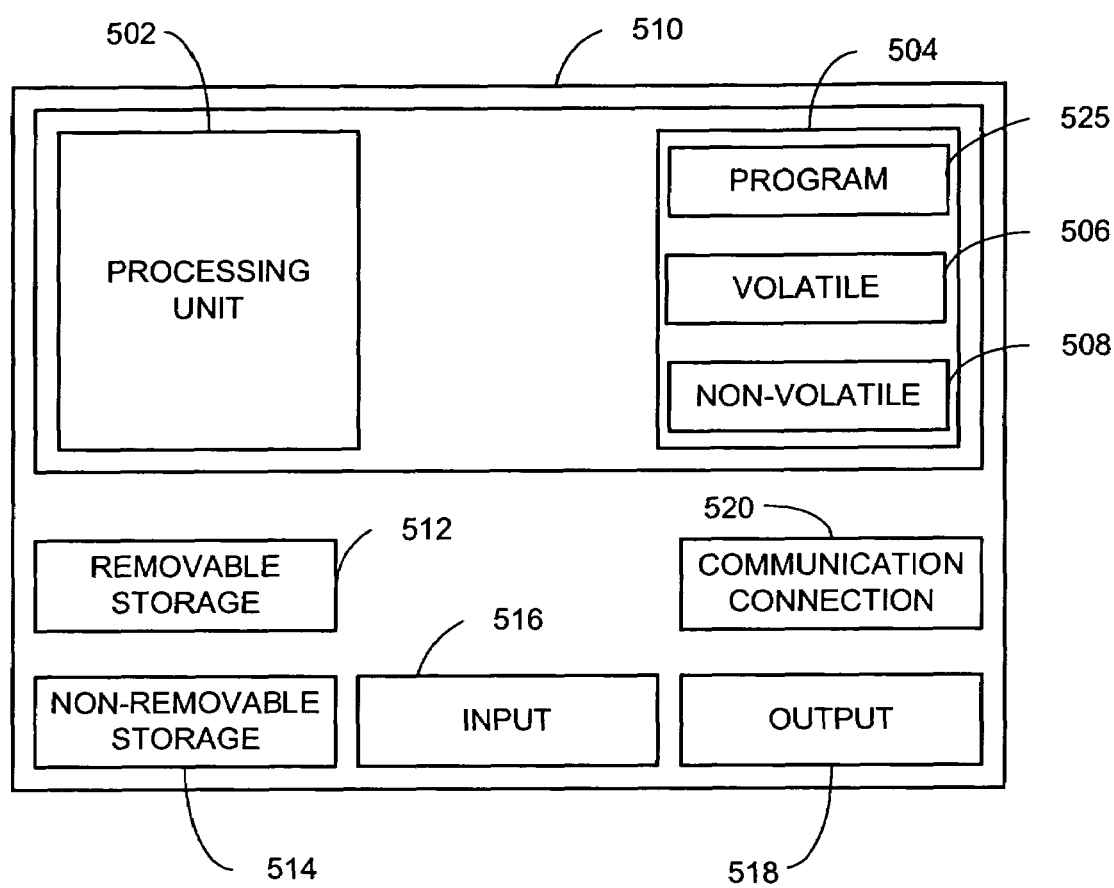
FIG. 5 is a block diagram of a system according to an example embodiment.

FIG. 5 is a block diagram of a computing system according to an example embodiment. In one embodiment, multiple such computer systems are utilized in a distributed network to implement multiple components in a transaction-based environment. An object-oriented architecture may be used to implement such functions and communicate between the multiple systems and components. One example computing device in the form of a computer 510, may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage typically includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles including a computer-readable medium. The term "computer readable medium" is also used to represent carrier waves on which the software is transmitted. For example, a computer program 525 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 510 to provide generic access controls in a COM based computer network system having multiple users and servers.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A method comprising:
   receiving a content item at a content subscription server from a first party over a network to which the content subscription server is connected, the content item including:
      functional content executable by a processor and operable within an application of a second party to cause data to be exported over the network by the second party's application in a manner that can be imported to an application of the first party; and
      a configuration package including instructions executable by a processor of a computing device to configure the functional content within the application of the second party, the configuration of the functional content performed in the application of the second party, the configuration of the functional content performed according to a link between a configuration rule defined in the configuration package and according to scoping information present in the application of the second party;
   executing an instruction set executable from a memory of the content subscription server by a processor to identify the second party to send the content item to; and
   sending the content item to the second party over the network.

2. The method of claim 1, wherein the functional content includes a communication specification.

3. The method of claim 1, wherein the functional content is further operable within the second party's application to cause data exported from the second party's application to be communicated to the first party's application over the network.

4. The method of claim 1, wherein importing data to the first party's application includes generating records within a database of the first party's application as a function of data exported from the second party's application.

5. The method of claim 1, wherein sending the content item to the second party includes sending the content item to two or more second parties.

6. The method of claim 1, wherein sending the content item to the second party includes sending the content item to the second party's application.

7. A machine-readable storage medium, with encoded instructions stored thereon, which when executed by a processor of a machine, cause the machine to:
   receive a content item from a first party over a network, the content item including:
      functional content executable by the processor and operable within an application of a second party to cause data to be exported over the network by the second party's application in a manner that can be imported to an application of the first party; and
      a configuration package to configure the functional content within the application of the second party, the configuration of the functional content performed in the application of the second party, the configuration of the functional content performed according to a link between a configuration rule defined in the configuration package and according to scoping information present in the application of the second party; and
send the content item to the second party.

8. The machine-readable storage medium of claim 7, wherein the functional content includes a communication specification.

9. The machine-readable storage medium of claim 7, wherein the functional content is further operable within the second party's application to cause data exported from the second party's application to be communicated to the first party's application over the network.

10. The machine-readable storage medium of claim 7, wherein importing data to the first party's application includes generating records within a database of the first party's application as a function of data exported from the second party's application.

11. The machine-readable storage medium of claim 7, wherein sending the content item to the second party includes sending the content item to two or more second parties.

12. The machine-readable storage medium of claim 7, wherein sending the content item to the second party includes sending the content item to the second party's application.

13. A system comprising:
   a microprocessor;
   a data storage device;
   a network interface; and
   a content item database managing data stored on the data storage device, wherein content items stored within the content item database include a content item defined by a first party, wherein the content item includes:
      functional content executable by a processor and operable within an application of a second party to cause data to be exported over a network via the network interface by the second party's application in a manner that can be imported to an application of the first party; and
      a configuration package to configure the functional content within the application of the second party, the configuration of the functional content performed in the application of the second party, the configuration of the functional content performed according to a link between a configuration rule defined in the configuration package and according to scoping information present in the application of the second party.

14. The system of claim 13, wherein the functional content includes a communication specification.

15. The system of claim 13, wherein the functional content is further executable by the processor and operable within the second party's application to cause data exported from the second party's application to be communicated to the first party's application.

16. The system of claim 13, wherein an import of data to the first party's application exported from the second party's application includes generating records within a database of the first party's application as a function of the data exported from the second party's application.

17. The method of claim 13, wherein the content item exists in the content item database of two or more second party applications.

* * * * *